United States Patent
Rutherford et al.

(10) Patent No.: US 10,711,578 B2
(45) Date of Patent: Jul. 14, 2020

(54) UMBILICAL END TERMINATION

(71) Applicant: TECHNIP FRANCE, Courbevoie (FR)

(72) Inventors: Alan Rutherford, Tyne and Wear (GB); James Fletcher-Wood, Tyne and Wear (GB)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 16/323,012

(22) PCT Filed: Aug. 4, 2017

(86) PCT No.: PCT/IB2017/001098
§ 371 (c)(1),
(2) Date: Feb. 4, 2019

(87) PCT Pub. No.: WO2018/025081
PCT Pub. Date: Feb. 8, 2018

(65) Prior Publication Data
US 2019/0186239 A1    Jun. 20, 2019

(30) Foreign Application Priority Data
Aug. 4, 2016   (GB) .................. 1613451.2

(51) Int. Cl.
| | | |
|---|---|---|
| *E21B 17/02* | (2006.01) | |
| *E21B 33/038* | (2006.01) | |
| *E21B 33/076* | (2006.01) | |
| *E21B 43/013* | (2006.01) | |
| *E21B 33/035* | (2006.01) | |
| *F16L 11/22* | (2006.01) | |
| *H01R 13/523* | (2006.01) | |

(52) U.S. Cl.
CPC ......... *E21B 43/013* (2013.01); *E21B 17/023* (2013.01); *E21B 33/0355* (2013.01); *E21B 33/0385* (2013.01); *E21B 33/076* (2013.01); *F16L 11/22* (2013.01); *H01R 13/523* (2013.01)

(58) Field of Classification Search
CPC ..... F16L 1/123; F16L 1/24; F16L 3/16; E21B 43/0107
See application file for complete search history.

(56) References Cited

U.S. PATENT DOCUMENTS 6,142,708 A * 11/2000 Tarlton ................ E21B 43/013
166/341
7,481,270 B2   1/2009 Shepler
(Continued)

FOREIGN PATENT DOCUMENTS

EP    2 066 957     6/2009
GB    2 442 315 A   4/2008
(Continued)

OTHER PUBLICATIONS

Search Report dated Nov. 17 2017 issued in corresponding International PCT Application No. PCT/IB2017/001098.
(Continued)

*Primary Examiner* — Benjamin F Fiorello
(74) *Attorney, Agent, or Firm* — Ostrolenk Faber LLP

(57) ABSTRACT

An umbilical end termination for a subsea umbilical comprising a plurality of functional elements and including at least one fluid line, wherein the umbilical end termination includes a pressure boosting system in line with the at least one fluid line.

24 Claims, 4 Drawing Sheets

(56) References Cited

U.S. PATENT DOCUMENTS

| | | | |
|---|---|---|---|
| 8,408,311 B2* | 4/2013 | Grayson | F16L 9/20 166/367 |
| 8,950,497 B2 | 2/2015 | Critsinelis et al. | 166/338 |
| 9,159,469 B2* | 10/2015 | Fogg | H01B 7/045 |
| 9,212,767 B2* | 12/2015 | Grayson | F16L 1/26 |
| 2003/0150619 A1 | 8/2003 | Meaders | 166/360 |
| 2006/0083624 A1 | 4/2006 | Cunningham et al. | 417/53 |
| 2009/0120632 A1* | 5/2009 | Worman | H01B 7/045 166/65.1 |
| 2009/0284068 A1* | 11/2009 | Yu | E02F 3/8858 299/1.9 |
| 2011/0067881 A1 | 3/2011 | Blake | 166/352 |
| 2012/0006444 A1 | 1/2012 | Tupper et al. | 138/149 |
| 2012/0175125 A1 | 7/2012 | Krohn et al. | 166/344 |

FOREIGN PATENT DOCUMENTS

| | | |
|---|---|---|
| GB | 2552693 A | 2/2018 |
| WO | WO 2000/08295 | 2/2000 |
| WO | WO 2008/037962 A1 | 4/2008 |
| WO | WO 2017/042632 A1 | 4/2008 |
| WO | WO 2010/074912 A2 | 7/2010 |

OTHER PUBLICATIONS

International Preliminary Report on Patentability dated Feb. 5, 2019 issued in corresponding International PCT Application No. PCT/IB2017/001098.

Combined Search and Examination Report dated Dec. 30, 2016 issued in corresponding Great Britain Patent Application No. GB1613451.2.

"Subsea Station for Chemical Storage and Injection: 2 Case Studies" MCE Deepwater Development, Apr. 9, 2014, presented by TOTAL, 18 pages https://www.ep.total.com/fr/subsea-station-chemical-storage-and-injection-two-case-studies.

"Subsea Station for Chemical Storage and Injection", Deep Offshore Technology Conference, (DOT 2012) presented at Perth, Australia, 2012, 19 pages.

* cited by examiner

UMBILICAL END TERMINATION

CROSS-REFERENCE TO RELATED APPLICATIONS

The present application is a 35 U.S.C. §§ 371 national phase conversion of PCT/IB2017/001098, filed Aug. 4, 2017, which claims priority to United Kingdom Patent Application No. 1613451.2, filed Aug. 4, 2016, the contents of which are incorporated herein by reference. The PCT International Application was published in the English language.

The present invention relates to an umbilical end termination for a subsea umbilical having a fluid line, a subsea umbilical having such an umbilical end termination, and a process for boosting the pressure of the fluid line in such a subsea umbilical.

BACKGROUND TO THE INVENTION

A subsea umbilical typically comprises a group of one or more types of elongated functional elements such as electrical cables, optical fibre cables, and optionally conduits for fluid transportation of for example, gas, water, or chemical products such as methanol. The functional elements can be assembled together in a helical or S/Z manner, and over-sheathed/over-armoured for mechanical strength and ballast. It is commonly desired for a single umbilical to be able to contain as many functional elements as are required for a particular application, for example as are required for a particular oil field where the umbilical is intended for use. Umbilicals are typically used for transmitting power, signals and fluids (for example fluid injection, hydraulic power, gas release, etc.) to and from a subsea installation.

Due to the development of ultra deep water (UDW) fields, subsea apparatus and equipment such as flexible risers, flow lines, umbilicals and pumps must be operated in more complex and harsh environments, including operating at higher temperatures and higher pressures, whilst also dealing with the conditions in ultra deep water. Such apparatus and equipment now requires to have improved performance and improved safety requirements than currently employed.

Some subsea production apparatus and equipment is located at the end of tie-backs, and requires the supply of various chemicals to be injected into the well. Such chemicals are commonly conveyed from the production facility on a surface vessel to the subsea equipment by one or more chemical injection tubes or lines, which tubes or lines are commonly structural elements within a subsea umbilical. However, with the development of longer UDW tie-back lengths, the associated pressure drop along the tube or line is also increasing, so that the subsea umbilical structure needs to be modified in response. Several parameters need to be considered in any modification of the umbilical structure, such as the tie-back length (and therefore expected pressure drop), the chemical flow rate, the injection pressure, and the pump discharge capacity available at the production facility.

The first possibility to overcome the above problems is simply to increase the size of the umbilical, in particular make it larger and more complex with a greater outer diameter. Increased umbilical performance should be possible to reach longer tie-backs with increased umbilical dimensions.

However, larger cross-section umbilicals also have a number of problems. Of these, the first is that there will be increased complexity in their manufacture, which may require greater machine capability as well as more complex umbilical termination connections and connection processes. Secondly, there is clearly an increase in costs, not only in CAPEX, but in qualification tests. Thirdly, there will be increased installation CAPEX and OPEX costs, (because of the increased dimensions and weight of the umbilical, as well as the increased installation equipment capability required).

A second possibility to overcome the above problems is to separate the chemical injection operation from the other functions provided or performed by the umbilical. In particular, to eliminate the chemical lines from the umbilical structure, such that the remaining umbilical is smaller and less complex. A development of this is to provide a subsea station with storage tanks for the chemical prior to injection. The tanks can be located close to the subsea processing equipment injecting the chemicals, but will require a local pump to assist pressure.

One example of this is shown in US 2012/0175125A, which shows a subsea oil and gas production Christmas tree control system with a HPU module as part of its pod, able to increase the local pressure for hydraulic or chemical fluids, thereby avoiding the need for long high pressure umbilicals.

However, the HPU is still required as a dedicated module in the pod, i.e. within the subsea production architecture, and is also externally exposed to the subsea conditions and environment. And the arrangement of a separate chemical injection operation requires two separate installation and laying operations, as well as organising the supply of a subsea station close to each subsea processing equipment, which again increases the CAPEX and OPEX requirements.

SUMMARY OF THE INVENTION

The present invention provides an umbilical end termination for a subsea umbilical. The subsea umbilical comprises a plurality of functional elements, and includes at least one fluid line. The umbilical end termination includes a pressure boosting system in line with the at least one fluid line.

Optionally, the pressure boosting system comprises one or more of the group comprising; hydraulic pumps, electrical pumps, and a combination of same.

Optionally, the pressure boosting system comprises a hydraulic pump.

Optionally, the pressure boosting system includes one or more of the group comprising; vane pumps, swash plate pumps, piston pumps, and a combination of same.

Optionally, the pressure boosting system is internally powered by the subsea umbilical.

Optionally, the subsea umbilical comprises a plurality of functional elements including two or more of the group comprising electrical cables, optical fibre cables, fluid conduits, and a combination of same.

Optionally, the subsea umbilical comprises at least one hydraulic conduit, and the hydraulic conduit powers the pressure boosting system.

Optionally, the subsea umbilical comprises at least one electrical cable, and the electrical cable powers the pressure boosting system.

Optionally, the umbilical end termination includes a docking station for the pressure boosting system.

Optionally, the umbilical end termination includes a bearing plate and a bulk head plate, and a docking station for the pressure boosting system is located between the bearing plate and the bulk head plate.

Optionally, the umbilical end termination comprises an umbilical termination assembly and a subsea termination interface.

Optionally, the umbilical termination assembly includes a docking station for the pressure boosting system.

Optionally, the docking station comprises a void within the umbilical end termination which is shaped to accept the pressure boosting system.

Optionally, the umbilical end termination is at least one part of a midline joint.

Optionally, the umbilical end termination includes an extension piece and the extension piece includes the pressure boosting system.

Optionally, the extension piece is a spool piece.

Optionally, the at least one fluid line of the umbilical end termination is a chemical injection fluid line.

Optionally, the umbilical end termination is filled with a resin.

Optionally, the umbilical end termination includes a pressure boosting system in line with more than one fluid line.

Optionally, the umbilical end termination comprises more than one fluid line, and more than one pressure boosting system.

The present invention provides a subsea umbilical comprising a plurality of functional elements including a least one fluid line, and comprising an umbilical end termination as defined herein.

The present invention provides a process for boosting the pressure of a fluid in a fluid line in a subsea umbilical comprising a plurality of functional elements and an umbilical end termination, the process comprising at least the steps of locating a pressure boosting system in the umbilical end termination, and in line with the at least one fluid line;

operating the pressure boosting system to boost the pressure of the fluid in the at least one fluid line.

Optionally, the process is for boosting the pressure of more than one fluid in more than one fluid lines in a subsea umbilical comprising a plurality of functional elements and an umbilical end termination, the process comprising at least the steps of locating one or more pressure boosting systems in the umbilical end termination, and in line with the fluid lines;

operating the pressure boosting system or systems to boost the pressure of the fluids in the fluid lines.

DESCRIPTION OF THE DRAWINGS

The invention can be better understood with reference to the following detailed description together with the appended illustrative drawings in which.

DETAILED DESCRIPTION OF THE DRAWINGS

Figure 1:
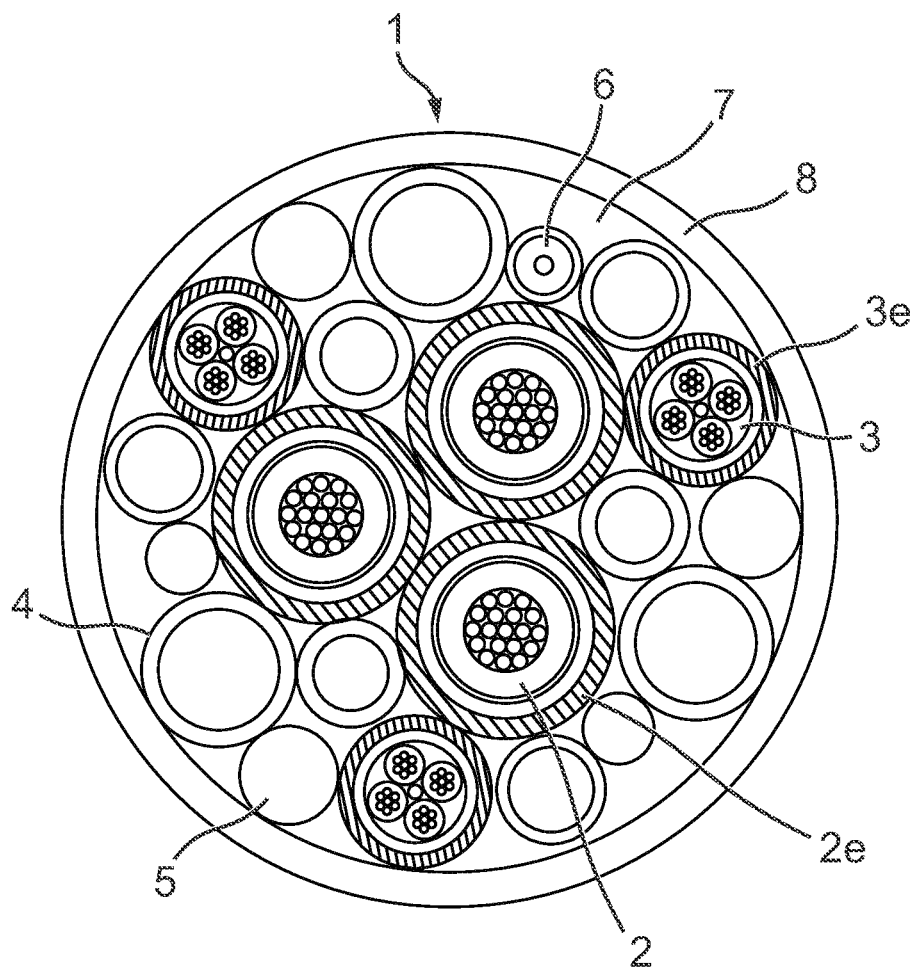
FIG. 1 is a transverse cross-sectional view of a prior art umbilical.

The present invention provides an umbilical end termination for a subsea umbilical including a pressure boosting system.

An umbilical comprises a group of one or more types of elongated functional elements such as electrical cables, optical fibre cables, conduits for fluid transportation of for example, gas, water, or chemical products such as methanol. The functional elements can be assembled together in a helical or S/Z manner, and over-sheathed/over-armoured for mechanical strength and ballast.

API (American Petroleum Institute) 17E "Specification for Subsea Umbilicals", provides standards for the design and manufacture of such umbilicals. Subsea umbilicals are installed at increasing water depths, commonly deeper than 2000 m. Such umbilicals have to be able to withstand severe loading conditions during their installation and their service life.

The main load bearing components in charge of withstanding the axial loads due to the weight and to the movements of the umbilical are steel pipes (see U.S. Pat. No. 6,472,614, WO93/17176 and GB2316990), steel rods (see U.S. Pat. No. 6,472,614), composite rods (see WO2005/124213), or tensile armour layers (see FIG. 1 of U.S. Pat. No. 6,472,614).

In the present invention, the umbilical comprises at least one fluid line, optionally more than fluid line; optionally more than fluid line carrying different fluids. The fluids include one or more of the group comprising: control fluids, hydraulic fluids and chemical injection fluids.

A control fluid or hydraulic fluid is a fluid employed in a subsea production system to transmit both hydraulic signals and power from one location in the system to another location. Such fluids may be either oil or water based, and contain one or more inhibitors to prevent corrosion, biological growth, and to tolerate a degree of sea water ingress without having a significant effect on performance and characteristics.

A chemical injection fluid (CIF) is a fluid transported through an umbilical comprising one or more production chemicals for injection into the flow stream, either at the well head or the well bore. Such fluids typically provide scale, corrosion, hydrate, emulsification, and asphaltene inhibition service. Each service is generally provided by a dedicated CIF and a dedicated fluid conduit.

An umbilical end termination or Subsea Umbilical Termination (SUT) is a mechanical fitting or mechanical assembly designed and adapted to mechanically, electrically, optically and/or hydraulically connect an umbilical or jumper bundle to a subsea system. The umbilical end termination may comprise separate Umbilical Termination Assembly (UTA) and a Subsea Termination Interface (STI) components, as defined by the API 17TR10 "Subsea Umbilical Termination (SUT)—Design Recommendations" ($2^{nd}$ edition—December 2015). Alternatively, these functions may be provided in a single unit.

The STI is a mechanical fitting or mechanical assembly which is designed and adapted to form the transition between the umbilical and the UTA. Typically, all tensile-strength members and some functional elements of the umbilical such as armour wires, rods, or metallic tubes themselves are physically terminated within the STI.

Optionally, the STI may comprise a transition spool housing the transition between umbilical tubing and UTA tubing in case there is lack of space to perform tube joints inside the UTA. For example, the transition spool may be formed of two split barrels comprising flanges, with nut and bolt connections provided on the flanges.

The UTA is a mechanical fitting or mechanical assembly designed and adapted to mechanically, electrically, optically, and hydraulically, as required, connect an umbilical or jumper bundle to a subsea system such as a production manifold, or a subsea distribution unit. The UTA may be manufactured in many shapes and sizes, depending on the number, size, and manufacturing specification of the cables, tubes, or hoses in the umbilical, but also on the cables, tubes, or hose end termination requirements, as well as on the internal routing and distribution of the tubes or hoses. The UTA may have a circular or a rectangular cross-section.

An umbilical end termination may also be defined as a mechanical fitting or mechanical assembly designed and adapted to fit at the end of an umbilical and be secured thereto, to provide the transfer of the functionality of the functional elements in the umbilical to the next apparatus, device or installation, optionally a mating assembly mounted on subsea equipment, on a surface facility, or optionally at the end of another umbilical.

In particular, an umbilical end termination allows the transfer of the operation of each functional element onwardly, such as allowing the continuation of operating loads, fluids, and electrical/optical and medium voltage power services. This can include direct connections to one or more suitable ports, optionally combined in a suitable mating assembly.

Typically, an umbilical end termination is an elongate structure having one end to fit around a subsea umbilical (for example, the STI), typically at or near the end of the umbilical, and a functional transfer end (for example, the UTA), which can comprise one or more connections or connectors, optionally one for each functional element or line, etc. Typically, the functional transfer end of an umbilical end termination comprises or includes a stab gap plate or bulkhead plate, which can extend across that end of the umbilical end termination, and provide one or more ports or connections, in particular hydraulic and electrical connectors, to allow conjunction with one or more other ports, in particular a complementary mating assembly or mating plate that allows multiple connections to be made by means of a single operation. In one example, one mating plate is mounted on a subsea structure or surface facility, for example a subsea termination or fixed Christmas tree, and a complementary mating plate is attached to the end of a jumper bundle or a flying lead.

The or each fluid line in the umbilical may be a steel tube or a thermoplastic conduit for a transmission of a fluid, such as a chemical fluid involved in a subsea operation. One example is a control fluid. A second example is a chemical injection fluid. The at least one fluid line may be a conduit for the transmission of hydrocarbons as part of annulus or gas injection requirements.

Optionally, the umbilical end termination comprises an extension piece able to extend the connection of the plurality of functional elements to a further end point beyond the end of the umbilical. One example is a spool-piece being a short length of a large bore pipe typically fitted between an umbilical end termination interface and a subsea termination or subsea distribution unit. The spool-piece increases the interface length to facilitate routing of the functional elements, optionally in a non-linear direction, and optionally to assist with spooling and unspooling the umbilical from a reel.

Optionally, the umbilical end termination includes a bearing plate providing a transverse device or structure within the umbilical end termination able to support one or more of the functional elements, preferably a majority and optionally all of the functional elements, at an intermediate location along the longitudinal direction of the umbilical end termination between the end of the umbilical and the mating end of the umbilical end termination.

Optionally, the umbilical end termination has or forms a cavity between its ends, through which the plurality of functional elements extend, and which remaining space within the cavity can be partly, substantially or wholly filled with a filler or filling material, such as a resin. Optionally, the filler or filling material is able to assist supporting the plurality or functional elements through the umbilical end termination, and to provide solidity to the umbilical end termination.

In addition, a midline joint may also be used to breakout a number of component functions at an intermediate location in between the two ends of the umbilical. The umbilical end termination, more particularly the Umbilical Termination Assembly (UTA), of a first umbilical end termination is normally connected and secured to the UTA of a second umbilical end termination thus forming a midline joint. Thus, the midline joint may comprise a first umbilical end termination which is connected to a first umbilical, and a second umbilical end termination which is connected to the first umbilical end termination and to a second umbilical. In this way, the midline joint can provide the transfer of the functionality of the functional elements, e.g. fluid lines, in the umbilical to another length of an umbilical.

Each UTA connected to the respective umbilical sections may comprise a structure or housing defining a large volume for the reception of the umbilical mechanical and functional elements, and forms parts of the midline joint. Each part of the midline joint can comprise a functional transfer end such as a stab gap plate or a bulkhead plate, to provide one or more connections or connectors, optionally one for each functional element or line, etc. and to allow conjunction with one or more other ports, in particular the complementary mating part of a midline joint assembly. Thus, it allows multiple connections to be made by means of a single operation.

A midline joint typically provides a split mechanical and functional umbilical interface between two umbilical sections, to allow the umbilical sections to be connected together and so increase the maximum length available to the user with one or more successive umbilical sections.

Optionally, the umbilical end termination forming at least one part of the midline joint comprises at least one pressure boosting system in line with at least one fluid line.

The pressure boosting system may comprise one or more of the group comprising; vane pumps, swash plate pumps, piston pumps, and a combination of same. Various types of fluid booster pumps are well known in the art, which can be hydraulically powered or electrically powered or both. Typically, such booster pumps are powered by one or more hydraulic and/or one or more electric motors.

Referring to the drawings, FIG. 1 shows a transverse cross sectional view of a prior art subsea umbilical 1 comprising an assembly of functional elements, including by way of illustration only and without limiting the present invention, a number of central electrical power cables 2, electrical signal cables 3, steel pipes or thermoplastic conduits 4, reinforcing steel or carbon rods 5, and optical fibre cables 6, all bundled together with filler material 7, and oversheathed by a polymeric external sheath 8.

Figure 2:
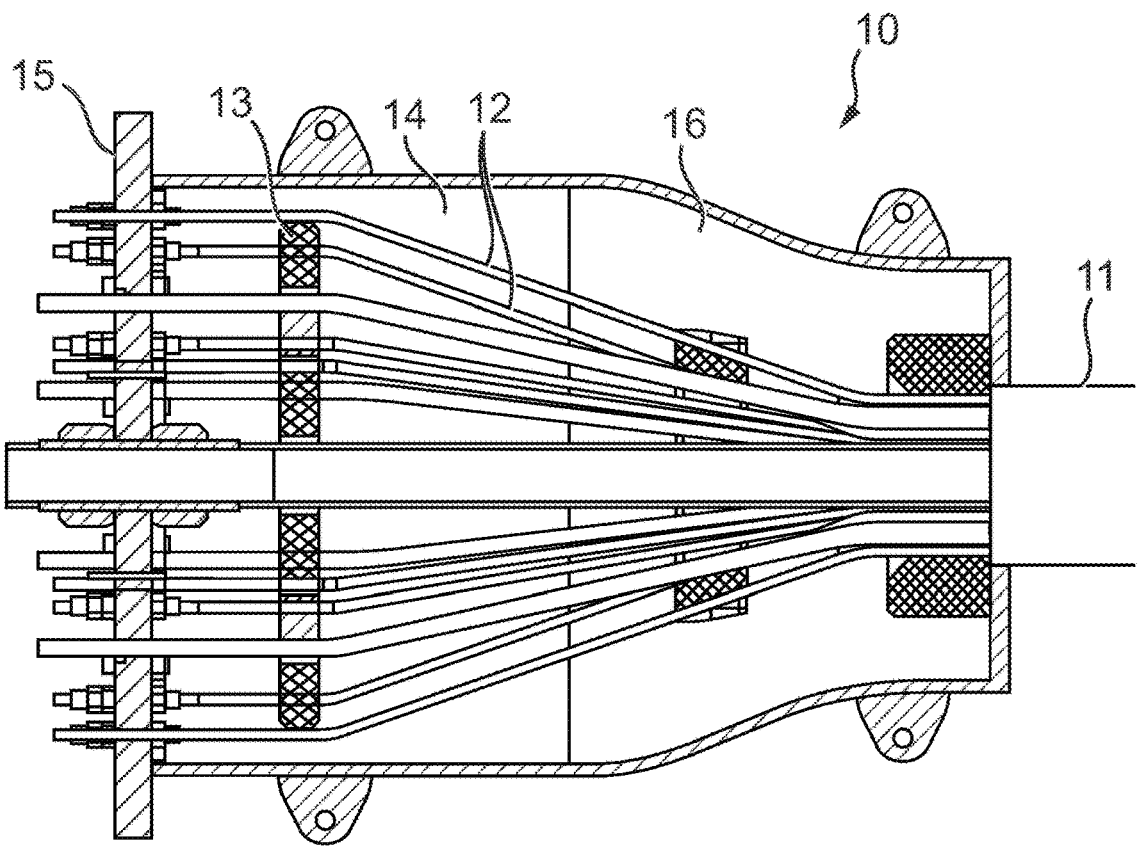
FIG. 2 is a longitudinal cross-sectional view of a prior art umbilical end termination attached to an end of an umbilical.

FIG. 2 shows a longitudinal cross sectional view of the end of another subsea umbilical 11 comprising an assembly of functional elements, attached to a known umbilical end termination 10. FIG. 2 shows the majority of functional elements such as steel tubes 12 passing through a bearing plate 13 to a steel bulkhead plate 15. The interior cavity 14 of the termination 10 is filled with a compression resistant resin 16, which can be gravity poured through a filler hole (not shown) situated at the top of the umbilical end termination 10. The resin 16 is used to prevent straightening of the tubes 12, i.e. to prevent radial displacement of the tubes 12 within the umbilical end termination 10. Tensile loads are transmitted through the steel tubes 12 directly to the bulkhead plate 15 and thus to the umbilical end termination 10.

Figure 3:
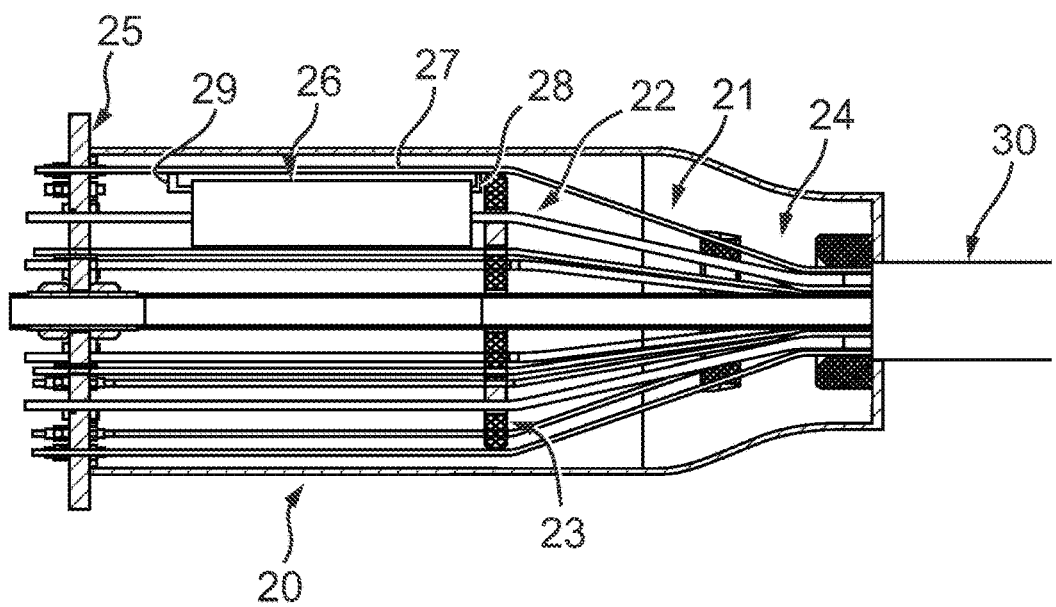
FIG. 3 is a longitudinal cross-sectional view of an umbilical end termination according an embodiment of the present invention.

FIG. 3 shows an umbilical end termination 20 according to one embodiment of the present invention. In this embodiment, the umbilical end termination 20 is a single unit rather than having separate STI and UTA components. One end of the umbilical end termination 20 is attached to a subsea umbilical 30 comprising a plurality of functional elements 21, and including at least one fluid line 22. The fluid line 22 is optionally a chemical injection fluid line.

The subsea umbilical 30 may be the same or different to the subsea umbilicals 1, 11 shown in FIGS. 1 and 2, and the cavity of the umbilical end termination 20 is optionally filled with a resin 24.

The plurality of functional elements 21 passes through a bearing plate 23 able to provide a suitable support thereto after spread from the end of the subsea umbilical 30, and then onto a bulkhead plate 25. The bulkhead plate 25 acts as a functional transfer end of the umbilical end termination 20 in a manner known in the art, and not further described herein.

Between the bearing plate 23 and the bulkhead plate 25 is located a pressure boosting system 26 in line with the fluid line 22. The pressure boosting system 26 may comprises a hydraulic pump (not shown) driven by a hydraulic motor (not shown), and powered by a low or lower pressure hydraulic supply and return line 27 via an inlet 28 and an outlet 29.

Optionally, the pressure boosting system 26 is able to deliver a fluid input pressure from the umbilical side in the range 3,000-15,000 psi, and to deliver a fluid input pressure on the delivery side in the range 15,000-30,000 psi.

The skilled man can see that the umbilical end termination 20 can comprise more than one pressure boosting system 26, either in relation to one or more of each separate fluid line at the end of the subsea umbilical 30, or in series with the existing pressure boosting system 26, and that the umbilical 30 can provide multiple delivery lines for controlling and/or powering the or each pressure boosting system incorporated into the umbilical end termination 20.

Optionally, the umbilical end termination 20 comprises a docking station (not shown) for the pressure boosting system 26. For example, the docking station may comprise a space (eg volume or void) provided within the umbilical end termination 20 into which the pressure boosting system may be fitted (ie without tubes or cables obstructing its connection), and connectors for connecting the pressure boosting system to a fluid line. In this way, the docking station may provide easy and quick connection of the pressure boosting system 26 in line with fluid line 22. The docking station may, for example, be provided during the umbilical end termination manufacturing. Thus, it can be used if required, depending on the subsea field requirement, eg if it is required to boost the pressure of the fluid flowing inside the fluid line 22.

Optionally, the docking station is located between the bearing plate 23 and the bulk head plate 25 of the umbilical end termination 20 because the space between them normally provides enough room for connecting the pressure boosting system 26.

If the umbilical end termination 20 comprises more than one pressure boosting system 26, more than one docking station may be provided inside the umbilical end termination 20. Optionally, the docking stations are located between the bearing plate 23 and the bulk head plate 25.

Figure 4:
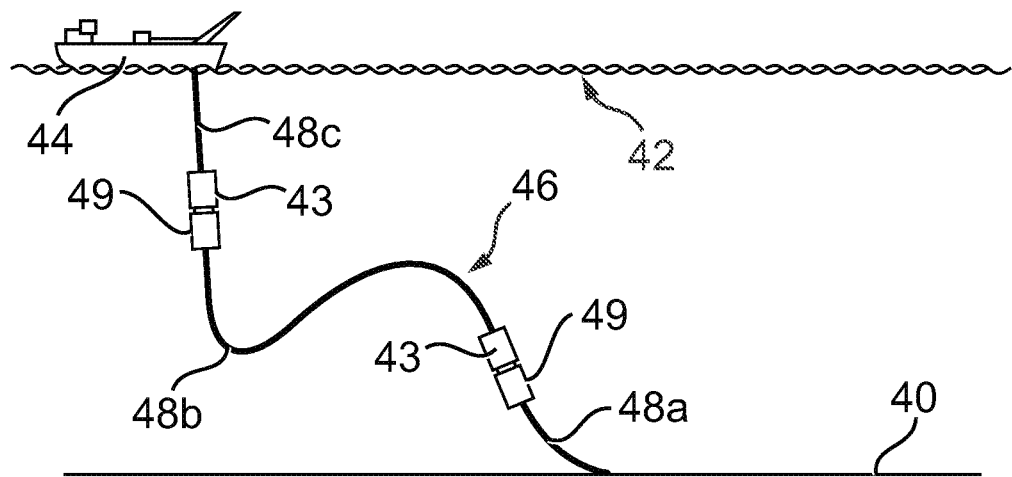
FIG. 4 is a schematic view of a multi-length umbilical between a surface vessel and a seabed according to another embodiment of the present invention.

FIG. 4 shows a surface vessel 44 as a possible floating production facility on a sea surface 42, having an umbilical 46 extending therefrom to a sea bed 40, and comprising three lines 48*a*, 48*b* and 48*c*. At the end of the upper most umbilical line 48*c* is an umbilical end termination 43 which includes a pressure boosting system (not shown) prior to its mating with a suitable mating assembly 49 of the middle umbilical 48*b*, which similarly ends with an umbilical end termination 43 connected to a mating assembly 49 of the lowermost umbilical 48*a*. FIG. 4 shows the use of two in line pressure boosting systems to ensure the desired fluid pressure in a fluid line in the umbilical 46 between the surface vessel 44 and the sea bed 40.

Figure 5:
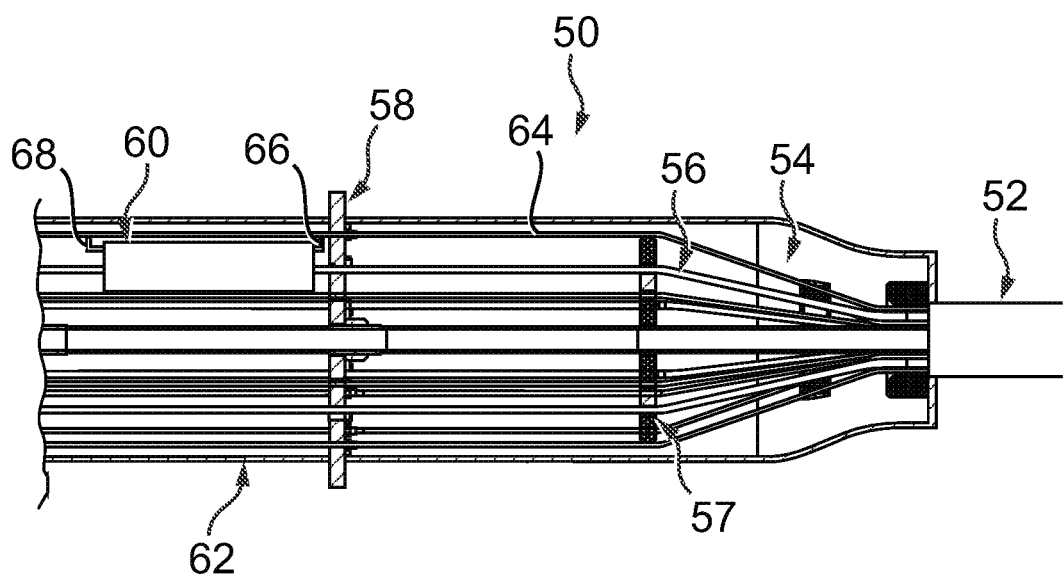
FIG. 5 is a schematic longitudinal cross-sectional view of an umbilical end termination according another embodiment of the present invention.

FIG. 5 shows a schematic longitudinal cross-sectional view of an umbilical end termination 50 according another embodiment of the present invention, comprising one end attached to a subsea umbilical 52 comprising a plurality of functional elements 54, and including at least one fluid line 56. The fluid line 56 is optionally a chemical injection fluid line. Again, the umbilical end termination 50 is a single unit rather than having separate STI and UTA components.

The plurality of functional elements 54 passes through a bearing plate 57 able to provide a suitable support thereto after spread from the end of the subsea umbilical 52, and then onto a bulkhead plate 58.

Whereas FIG. 3 shows locating a pressure boosting system 26 within the cavity 24 of its umbilical end termination 20, FIG. 5 shows locating a pressure boosting system 60 within an extension piece 62 able to extend the connection of the functional elements 54 to a further end point beyond the end of the umbilical 52.

The extension piece 62 may be a spool-piece, being a short length of a large bore pipe typically fitted between an umbilical end termination interface such as the bulkhead plate 58 and a subsea termination or subsea distribution unit (not shown). The spool-piece increases the interface length to facilitate routing of the functional elements, optionally in a non-linear direction, and optionally to assist with spooling and unspooling the umbilical 52 from a reel.

The pressure boosting system 60 is still in line with the fluid line 56, and may comprise a hydraulic pump (not shown) driven by a hydraulic motor (not shown), and powered by a low or lower pressure hydraulic supply and return line 64 via an inlet 66 and an outlet 68.

The skilled man can see that the extension piece 62 can provide room for more than one pressure boosting system 60, either in relation to one or more of fluid lines at the end of the subsea umbilical 52 or the same fluid line, as well as being 'reelable'.

Figure 6:
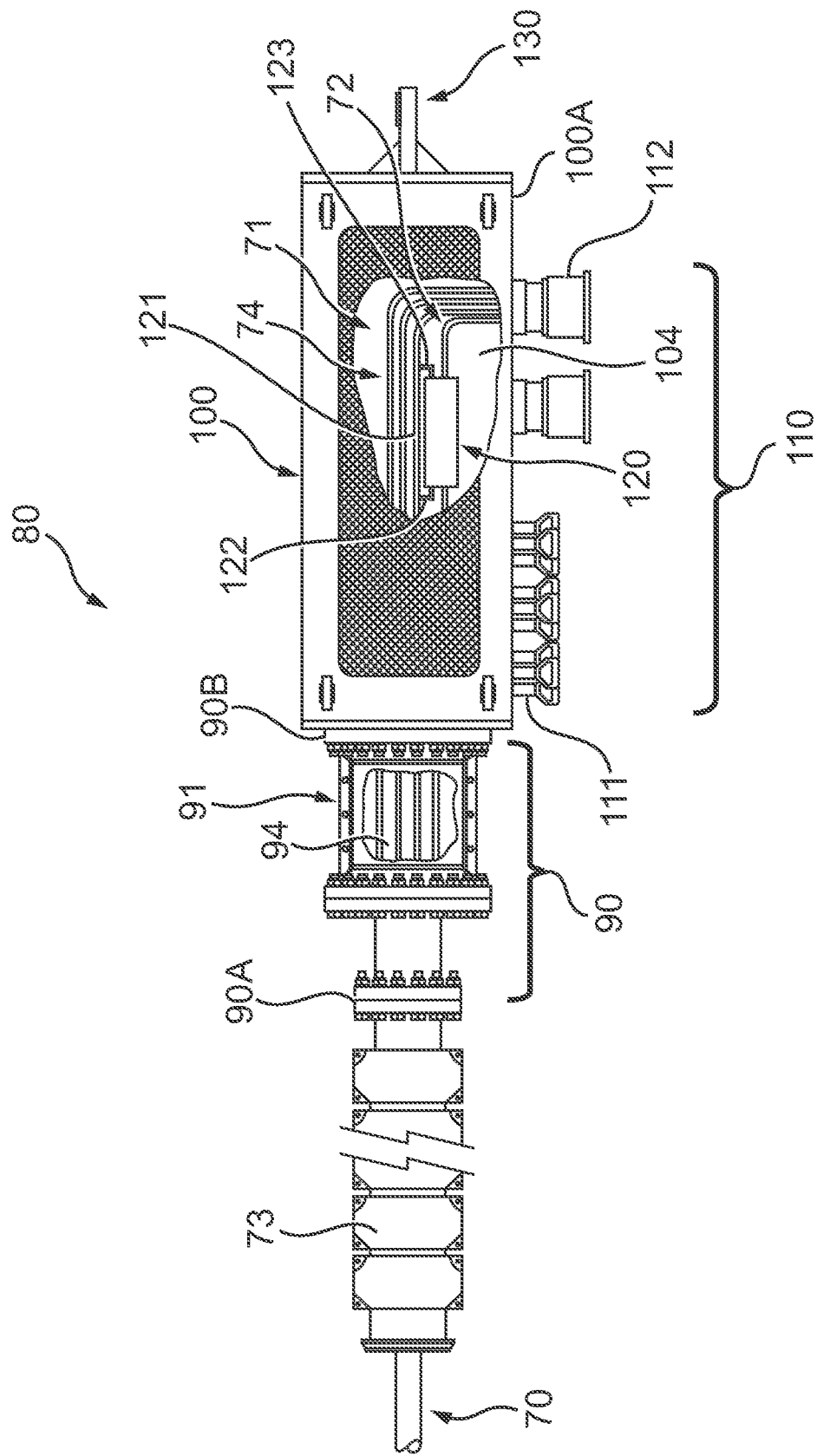
FIG. 6 is a schematic longitudinal view of an umbilical end termination according a further embodiment of the present invention.

FIG. 6 shows a schematic longitudinal top side elevation view of an umbilical end termination 80 (or Subsea Umbilical Termination SUT) according to a further embodiment of the present invention, comprising one end attached to a subsea umbilical 70 comprising a plurality of functional elements 71 such as those represented on FIGS. 3 and 5 (labelled items 21 and 54).

The umbilical end termination 80 of FIG. 6 comprises two component parts. These are a Subsea Termination Interface (STI) 90 which is connected at a first end 90A to the end of the subsea umbilical 70 and, at a second, opposite, end 90B of the STI 90, an Umbilical Termination Assembly (UTA) 100. In this embodiment, a transition spool (or extension piece) 91 is shown as part of the STI 90. The transition spool takes the form of a split barrel which is provided with nut and bolt connections at each end. Nonetheless, the transition spool 91 is optional. Optionally, the umbilical end termination 80 comprises an extension piece. For example, the extension piece may be a spool-piece which can connect the umbilical end termination 80 to subsea equipment. The umbilical end termination 80 has an interior cavity 74 which comprises the interior cavity 94 of the STI 90 and the interior cavity 104 of the UTA 100. Optionally, the interior cavity 74 of the umbilical end termination 80 is filled with a resin. Preferentially, at least the interior cavity 94 of the Subsea Termination Interface 90 is filled with a resin.

As described above, FIG. 3 shows a pressure boosting system 26 located within the cavity 24 of the umbilical end termination 20. FIG. 5 shows a pressure boosting system 60 located within an extension piece 62 able to extend the connection of the functional elements 54 to a further end point beyond the end of the umbilical 52. In contrast, FIG. 6 shows locating a pressure boosting system 120 within the UTA 100 of the umbilical end termination 80, as an integral part of it, able to connect the functional elements 71 of the umbilical 70 to a subsea system via Quick Connect plates (QC plates) and flying leads.

The pressure boosting system 120 is still in line with the fluid line 72, and may comprise a hydraulic pump (not shown) driven by a hydraulic motor (not shown), and powered by a low or lower pressure hydraulic supply and return line 121 via an inlet 122 and an outlet 123.

Alternatively, the pressure boosting system 120 may comprise an electrical pump (not shown) driven by an electrical motor (not shown), and powered by electrical power cables from the subsea umbilical 70.

Also shown in FIG. 6, at the opposite end of UTA 100 to the end connected to STI 90 there is provided a padeye 130. The padeye 130 helps offshore installation of the subsea umbilical 70 fitted with its umbilical end termination 80, for example by assisting with handling and lifting operations on board an installation vessel, such as transferring the umbilical and SUT from a storage area (carousel or reel) towards the laying equipment (eg vertical or horizontal laying system).

In addition, controls connection hardware 110 is mounted on side face 100A of the UTA 100. This controls connection hardware 110 may comprise electrical and/or optical connectors 111, multi quick connect plates (MQC plates) 112 and when required, isolation valves (not shown). ROV (Remotely Operated Vehicle) grab bars (not represented) may also be installed on the side face 100A of the UTA 100 to help ROV operations during subsea installation and/or subsea intervention phases.

Optionally, at least one bulk head plate (not shown) may be used within the UTA 100 to mount or locate functional elements 71, i.e. hydraulic and/or electrical and/or optical connectors.

Optionally, as is known in the art a bend limiter or a bend stiffener (73) may be fitted around the subsea umbilical 70 body to limit its bending radius or to control its bending strain. In FIG. 6 these are fitted to the subsea umbilical 70 close to the first end 90A of Subsea Termination Interface (STI) 90.

Typically, the umbilical end termination is fitted to the subsea umbilical end onshore, after the manufacturing of said subsea umbilical. Then, the subsea umbilical comprising the umbilical end termination is stored on a reel for direct spooling or lifting on an installation vessel. Alternatively, the subsea umbilical may be stored on a factory carousel for spooling onto an installation vessel's lay system. Once the vessel is offshore, the subsea umbilical fitted with its umbilical end termination is installed subsea onto the seabed. Then, connection between the umbilical end termination and subsea equipment can be performed.

The present invention shows the ability of the present invention to boost pressure in at least one fluid line in a subsea umbilical to a subsea location, and to provide this function within known subsea architecture.

Whilst the use of pumps is known in the art for boosting the pressure and flow at or near an injection point of a well, the present invention can provide a dramatic increase in flexibility of the use of pressure boosting systems, now within subsea umbilicals. Such systems can easily be added onshore to the end of an umbilical.

The present invention is also possible with relatively minor changes to the manufacture of known or 'standard' umbilical end terminations, and without changing the umbilical outer diameter, such that a subsea umbilical having an umbilical end termination of the present invention can be manufactured using existing technology and processes, and can be reeled and laid using existing using existing technology and processes, in particular the same sized reels, and the same laying procedure.

The invention claimed is:

1. An umbilical end termination comprising one end to fit at an end of a subsea umbilical; a functional transfer end opposite the one end; and a cavity located between the one end and the functional transfer end; a plurality of functional elements from the umbilical including at least one fluid line extending into the cavity, and the functional transfer end to transfer the functionality of the plurality of functional elements in the umbilical to a next apparatus, device or installation, wherein the umbilical end termination includes within the cavity a pressure boosting system in line with the at least one fluid line in the cavity.

2. The umbilical end termination as claimed in claim 1, wherein the pressure boosting system comprises one or more of the group comprising: hydraulic pumps, electrical pumps, and a combination of same.

3. The umbilical end termination as claimed in claim 2, wherein the pressure boosting system comprises a hydraulic pump.

4. The umbilical end termination as claimed in claim 1, wherein the pressure boosting system includes one or more of the group comprising: vane pumps, swashplate pumps, piston pumps, and a combination of same.

5. The umbilical end termination as claimed in claim 1, wherein pressure boosting system is internally powered by the subsea umbilical.

6. The umbilical end termination as claimed in claim 1, wherein the subsea umbilical comprises a plurality of functional elements including two or more of the group comprising: electrical cables, optical fibre cables, fluid conduits, and a combination of same.

7. The umbilical end termination as claimed in claim 6, wherein the subsea umbilical comprises at least one hydraulic conduit, and the hydraulic conduit powers the pressure boosting system.

8. The umbilical end termination as claimed in claim 6, wherein the subsea umbilical comprises at least one electrical cable, and the electrical cable powers the pressure boosting system.

9. The umbilical end termination as claimed in claim 1, wherein the umbilical end termination includes a docking station for the pressure boosting system.

10. The umbilical end termination as claimed in claim 9, wherein the docking station comprises a void within the umbilical end termination which is shaped to accept the pressure boosting system.

11. The umbilical end termination as claimed in claim 1, wherein the umbilical end termination includes a bearing plate and a bulkhead plate, and a docking station for the pressure boosting system is located between the bearing plate and the bulkhead plate.

12. The umbilical end termination as claimed in claim 1, wherein the umbilical end termination comprises an umbilical termination assembly and a subsea termination interface.

13. The umbilical end termination as claimed in claim 12, wherein the umbilical termination assembly includes a docking station for the pressure boosting system.

14. The umbilical end termination as claimed in claim 1, wherein the umbilical end termination is at least one part of a midline joint.

15. The umbilical end termination as claimed in claim 1, wherein the umbilical end termination includes an extension piece and the extension piece includes the pressure boosting system.

16. The umbilical end termination as claimed in claim 15, wherein the extension piece is a spool piece.

17. The umbilical end termination as claimed in claim 1, wherein the at least one fluid line is a chemical injection fluid line.

18. The umbilical end termination as claimed in claim 1, wherein the umbilical end termination is filled with a resin.

19. The umbilical end termination as claimed in claim 1, wherein the umbilical end termination includes a pressure boosting system in line with more than one fluid line.

20. The umbilical end termination as claimed in claim 1, comprising more than one fluid line, and more than one pressure boosting system.

21. A subsea umbilical comprising a plurality of functional elements including at least one fluid line, and comprising an umbilical end termination as claimed in claim 1.

22. A subsea umbilical comprising a plurality of functional elements including at least one fluid line, and including a midline joint comprising an umbilical end termination as claimed in claim 1.

23. A process for boosting the pressure of a fluid in at least one fluid line in a subsea umbilical comprising a plurality of functional elements and an umbilical end termination having one end to fit at an end of the subsea umbilical, a functional transfer end opposite the one end, and a cavity located between the one end and the functional transfer end, the cavity receiving the plurality of functional elements and the at least one fluid line, and the functional transfer end to transfer the functionality of the plurality of functional elements in the umbilical to a next apparatus, device or installation, the process comprising at least the steps of:
  locating a pressure boosting system in the cavity of the umbilical end termination, and in line with the at least one fluid line received in the cavity of the umbilical end termination; and
  operating the pressure boosting system to boost the pressure of the fluid in the at least one fluid line.

24. The process as claimed in claim 23 for boosting the pressure of more than one fluid in more than one fluid lines in a subsea umbilical comprising a plurality of functional elements and an umbilical end termination, the process comprising at least the steps of
  locating one or more pressure boosting systems in the umbilical end termination, and in line with the fluid lines;
  operating the pressure boosting system or systems to boost the pressure of the fluids in the fluid lines.

* * * * *